May 7, 1935. J. BAUMANN Re. 19,557

ATTACHMENT FOR DOUGHNUT CUTTING AND COOKING MACHINES

Original Filed July 18 1927

John Baumann INVENTOR

BY Victor J. Evans

ATTORNEY

WITNESS: H. H. Samuels

Reissued May 7, 1935

Re. 19,557

UNITED STATES PATENT OFFICE 19,557

ATTACHMENT FOR DOUGHNUT CUTTING AND COOKING MACHINES

John Baumann, Philadelphia, Pa.

Original No. 1,670,230, dated May 15, 1928, Serial No. 206,717, July 18, 1927. Application for reissue September 22, 1930, Serial No. 483,733

4 Claims. (Cl. 107—14)

The present invention relates to an attachment for application to a doughnut cutting and cooking machine, the purpose of the invention being to form stick doughnuts of a banana formation, the attachment comprising a divider or separator to be positioned between a stem centrally located within a doughnut forming tube, and the wall of said tube, the lower marginal edge of the tube to engage with a shoulder on the divider or separator to hold the divider in engagement with a disc, between which and the lower marginal edge of the tube a doughnut may be extruded, whereby as the doughnut material such as dough is extruded from the tube and from between the lower marginal edge of the tube and a disc, the material may be divided, allowing the dough to assume an approximate formation of a banana. It is true that the doughnut can be straightened out as much as possible if so desired, or it may be curved in any form.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1:
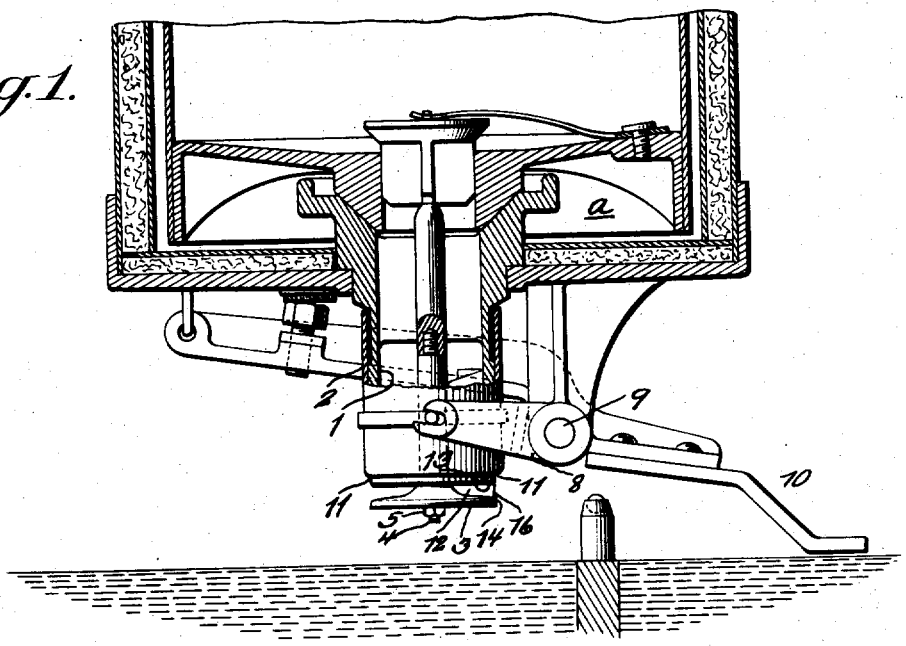
Figure 1 is a vertical sectional view through the lower part of a conventional type of doughnut forming machine, such as is disclosed in the United States Letters Patent No. 1,492,542, and an improved divider or separator as applied within the tube and between the lower marginal edge of the tube and a disc spaced slightly below the lower edge of the tube.
Figure 3:
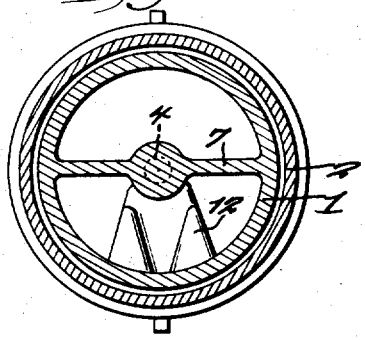
Figure 3 is a cross sectional view on line 3—3 of Figure 2.
Figure 2:
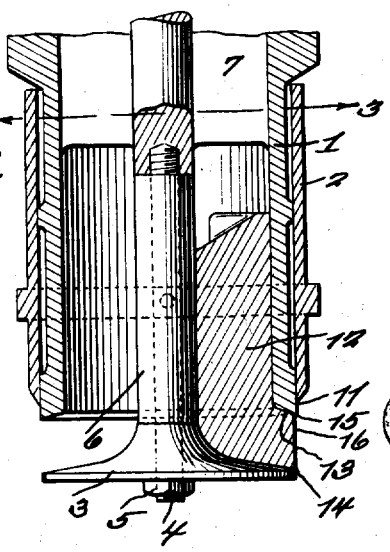
Figure 2 is a vertical sectional view through the tube and also through a movable sleeve operatively and telescopically mounted on the tube for cutting the doughnut as it is extruded, the divider being shown in section between the tube and the stem.

Referring to the drawing, 1 identifies a tube outlet at the lower end of a conventional type of doughnut cooking and cutting machine identified generally by the letter *a*, and 2 is a cutting sleeve, which operates telescopically on the outside of the tube 1. The doughnut material extrudes through the tube and discharges from its lower end between said end and a disc 3, which is detachably mounted by a screw 4 and a nut 5 on the lower end of stem 6, the upper part of the stem being supported integrally from a bridge or web 7 extending across the tube 1. The doughnut cutting sleeve 2 is operated by means of a double armed yoke 8 which is operatively pivoted as identified at 9, and the yoke 8 is operated by a cam member 10, which lies in the path of actuating members not shown, but are employed in connection with the machine as disclosed in the patent herein identified.

As the sleeve 2 moves down after sufficient quantity of dough has extruded from the tube 1, the lower marginal cutting edge 11 of the sleeve 2 will act to cut the doughnut from the main portion of dough in the tube.

Figure 4:
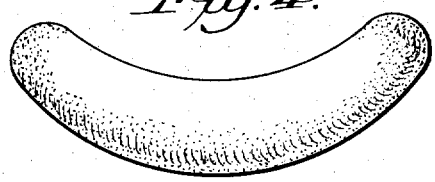
Figure 4 is a detailed view of the stick or banana shaped doughnut.

Positioned in the tube 1, between the wall of the tube and the stem 6 is a divider or separator 12, which may be made of any suitable material, either metal or wood, and it has a shoulder 13, with which the lower inwardly beveled edge of the tube 1 engages. The disc 3 is secured in place on the stem, as previously stated by means of a screw 4 and a nut 5. By removing the nut the disc may be detached, allowing the divider or separator to be inserted in place. By constructing the divider with a shoulder and allowing the divider to engage down upon the disc, the divider is held securely in position and against displacement. As the dough feeds down through the tube, it is divided at a point from within the tube to a point, where the divider is substantially flush with the edge of the disc at 14 and the outer surface of the tube at 15, so that the sleeve when operated may pass down over the outer exposed edge 16 of the divider and thereby cut the dough to form the doughnut from the main portion of the dough, that portion of the dough being cut having been divided, so that as it falls into the boiling liquid and is cooked it will assume the formation as in Figure 4, substantially banana shape.

In order to remove the divider, the nut 5 can be detached and the disc removed, after which the divider can be withdrawn from the tube.

The invention having been set forth, what is claimed is:

1. The combination with a doughnut cutting machine having an annular channel in which the dough is shaped into ring form and means for forcing the dough through said channel, of means for radially splitting the ring.

2. The combination with a doughnut cutting machine having an annular channel in which the dough is shaped into ring form and means for forcing the dough through said channel, of means for radially dividing the ring during its formation to provide a split dough annulus.

3. The combination with a doughnut cutting machine having a dough extruding tube with a centrally supported stem therein which is provided with a disc at its lower end spaced below the lower edge of the tube and a cutting sleeve operable on the exterior of the tube, of a divider mounted within the tube between its wall and the stem and having a shouldered portion engaging between the lower edge of the tube and the disc and dividing the dough as it is extruded and cut.

4. As an article of manufacture, a divider for a doughnut cutting machine, comprising a divider body positioned between the central stem and dough extruding tube of the machine and having a shouldered part interposed between the disc on the lower end of said stem and the lower edge of the tube for dividing the dough extruded from the lower end of the tube.

JOHN BAUMANN.